(12) United States Patent
Pan et al.

(10) Patent No.: US 8,944,631 B2
(45) Date of Patent: Feb. 3, 2015

(54) LED MIXED LIGHTING FOR TISSUE CULTURE OF ORCHIDS

(75) Inventors: Xuedong Pan, Zhejiang (CN); Hong Zhou, Zhejiang (CN); Xuke Li, Zhejiang (CN); Wenhai Wang, Zhejiang (CN); Huahong Huang, Zhejiang (CN)

(73) Assignee: Hangzhou Hanhui Opto-Tech Co., Ltd., Binjiang District, Hangzhou, Zhejiang Province (CN)

( * ) Notice: Subject to any disclaimer, the term of this patent is extended or adjusted under 35 U.S.C. 154(b) by 210 days.

(21) Appl. No.: 13/575,442

(22) PCT Filed: Jan. 27, 2011

(86) PCT No.: PCT/CN2011/070722
§ 371 (c)(1),
(2), (4) Date: Jul. 26, 2012

(87) PCT Pub. No.: WO2011/091760
PCT Pub. Date: Aug. 4, 2011

(65) Prior Publication Data
US 2012/0293993 A1    Nov. 22, 2012

(30) Foreign Application Priority Data

Jan. 28, 2010  (CN) .......................... 2010 1 0103929

(51) Int. Cl.
F21V 9/00    (2006.01)
A01G 7/04    (2006.01)
F21Y 105/00  (2006.01)
F21Y 101/02  (2006.01)

(52) U.S. Cl.
CPC ........... *A01G 7/045* (2013.01); *F21Y 2105/003* (2013.01); *F21Y 2101/02* (2013.01)
USPC ......................................... 362/231; 362/253

(58) Field of Classification Search
CPC ...................................................... A01G 7/045
USPC ....................... 362/231, 84, 253, 234, 249.02
See application file for complete search history.

(56) References Cited

FOREIGN PATENT DOCUMENTS

JP          2001086860 A  *  4/2001  .............. A01G 7/00

* cited by examiner

*Primary Examiner* — Elmito Breval
(74) *Attorney, Agent, or Firm* — Tianhua Gu; Global IP Services

(57) ABSTRACT

This invention discloses a LED mixed lighting for tissue culture of orchids. Due to limitation of technology, currently it lacks of LED lighting directly used for orchids, especially for tissue culture of *dendrobium candidum*, ornamental *dendrobium* and *phalaenopsis*. This inventions adopts a technical proposal as follows: a LED fixed lighting for tissue culture of orchids is characterized in that said many red and blue LEDs will constitute several units; each unit has 3 blue LEDs and there are 8 red LEDs in elliptical or rounded patterns surrounding said 3 blue LEDs, and said 3 blue LEDs are gathered in triangular pattern, and said 8 red LEDs are separated at interval. This invention makes special arrangement of lamps and realizes adjustment of light quality and light period by turning on or turning off red LEDs and blue LEDs, and by this way, a LED mixed light which is distributed evenly and suitable for tissue culture of orchids.

9 Claims, 5 Drawing Sheets

LED MIXED LIGHTING FOR TISSUE CULTURE OF ORCHIDS

CROSS REFERENCE TO RELATED PATENT APPLICATION

The present application is the US national stage of PCT/CN2011/070722 filed on Jan. 27, 2011, which claims the priority of the Chinese patent application No. 201010103929.9 filed on Jan. 28, 2010, which application is incorporated herein by reference.

FIELD OF THE INVENTION

This invention refers to LED mixed lighting, especially LED mixed lighting for tissue culture of orchids.

BACKGROUND OF THE INVENTION

The growth and development of plants mainly relies on sunlight. But for other commercial crop such as vegetables, flowers and medicinal plants, their industrialization and tissue culture still needs artificial light. Especially when light application time is very short in late Autumn, Winter and Spring, it will lack of light seriously inside greenhouses and crops can't grow up normally, which would become worse in case of continuous cloudy day, greasy weather and rain and snow day. Therefore, artificial lighting, as a direct light supply inside greenhouses, is an efficient way to promote the growth of plants. And the theoretical basis on efficient and energy-saving supplementary light for plants is mainly from the theory that plants will absorb the light selectively. In recent years, people are working hard on simulating the absorption spectrum of plants so as to develop a kind of light source, by which its emission spectrum will approximate to the absorption spectrum of plants to the hilt to realize a resonance absorption and higher efficiency of photosynthesis.

In one hand, with hundred years of the technology on tissue culture of plants, the research on industrialization of important commercial crops is still in the ascendant by this technology. In the other hand, the improvement on artificial lighting for tissue culture of plants mainly concerns on cost-saving artificial light with lower heat elimination and high efficiency, which is suitable for growth of plants. At present, artificial lights used for tissue culture of plants in our country are mainly provided by filament lamp, fluorescent lamp, sodium lamp and high pressure mercury lamp and so on. However, the emission spectrum of these artificial lights can not satisfy the selective requirement for the growth of plants, and improve low efficient supplemental light, short service life of fluorescent tube and low luminous efficiency, great heat productivity of fluorescent tube which asks for extra electricity, and thus it leads to high cost of power consumption.

It is proved by the preliminary study of LED light source at abroad and Taiwan that LED light source can be used as artificial lighting inside greenhouses so as to enhance growth and quality of plants. Compared with traditional artificial lighting, features of LED include adjustable light intensity, light spectrum, low cooling load, high electro-optic conversion efficiency, small volume, long service life, using direct current and setting of special wavelength, fixing of wavelength etc, without harmful gas or with good performance on environmental protection, and thus LED is an artificial lighting system quite suitable for tissue culture of plants.

*Dendrobium candidum*, ornamental *dendrobium* and *phalaenopsis* and other orchids take important position in medicine and flowering plant industries of our country, and as the economics develops quickly, their and scale and production value will have further increase and improvement. Based on analysis of current production status, there are few problems to be solved urgently in the period of seeding and breeding of orchids. The first problem is high consumption of energy, which will lead to high production cost; the second problem is long cycle of seeding and breeding, difficult to satisfy the culture requirement of farmers. Due to limitation of technology, currently it lacks of LED lighting directly used for orchids, especially for tissue culture of *dendrobium candidum*, ornamental *dendrobium* and *phalaenopsis*.

SUMMARY OF THE INVENTION

The technical problem to be solved by this invention is to overcome aforesaid defects in existing technology and provide a LED mixed lighting for tissue culture of orchids. And adjustment of light quality and light cycle can be realized by special arrangement of lamps, so as to produce an evenly-distributed and suitable LED mixed light for tissue culture of orchids.

Whereas, this inventions adopts a technical proposal as follows: a LED fixed lighting for tissue culture of orchids, with lamp holder, several red LEDs and blue LEDs on lamp holder, is characterized in that said many red and blue LEDs will constitute several units; each unit has 3 blue LEDs and there are 8 red LEDs in elliptical or rounded patterns surrounding said 3 blue LEDs, and said 3 blue LEDs are gathered in triangular pattern, and said 8 red LEDs are separated at interval, among which 4 red LEDs will compose a group, and the other 4 LEDs will compose another group, and 4 red LEDs of each group are distributed in rectangular pattern, which helps to construct an artificial lighting of adjustable light quantity, light spectrum, light-supply frequency and duty cycle by using high light red and blue LEDs. This invention makes special arrangement of lamps and realizes adjustment of light quality and light cycle by turning on or turning off red LEDs and blue LEDs, and by this way, a LED mixed light which is distributed evenly and suitable for tissue culture of orchids is produced.

As further perfection and complementing to aforesaid technical proposal, this invention adopts following technical measures:

The far peripheral LEDs at lamp holder are red LEDs, and 2 red LEDs at the most outer side of the unit are also 2 red LEDs at the most outer side of the opposite side of adjacent unit.

For each unit, central point of two rectangles and those of triangle are coincident, and space between adjacent units is within 1.3-5 cm, which is adjusted according to the length and width of LED mixed lighting.

For each unit, the light quality with a red-blue light ratio of 4:1, 4:2, 4:3, 8:1, 8:2 or 8:3 can be controlled and realized by turning on or turning off red LEDs and blue LEDs, very suitable for application on tissue culture of *dendrobium candidum*, ornamental *dendrobium* and *phalaenopsis* and other orchids. And the center wavelength of red LED is 630 nm, and that of blue LED is 460 nm.

By special arrangement of lamps, this invention has made adjustment according to actual requirement and realized the adjustment of light quality and light cycle, and by this way, different growing cycle of orchids can be satisfied, especially the light demand of *dendrobium candidum*, ornamental *dendrobium* and *phalaenopsis* during different growing cycles, shorting the cycle of seeding and breeding greatly. Besides, in combination with the light demand of *dendrobium candidum* and the like orchids, a special lighting system for tissue culture has been developed in this invention, which has important significance to solve the problem of high energy consumption and long cycle in breeding period and promote quick and continuous development of related industries.

Further introductions on this invention will be made hereinafter by attached drawings of instructions and embodiments.

In aforesaid drawings,  indicates red LED (also means turning off),  indicates blue LED (also means turning off),  indicates that red LED is ON, and  indicates that blue LED is ON.

DETAIL DESCRIPTION OF THE INVENTION

Figure 1:
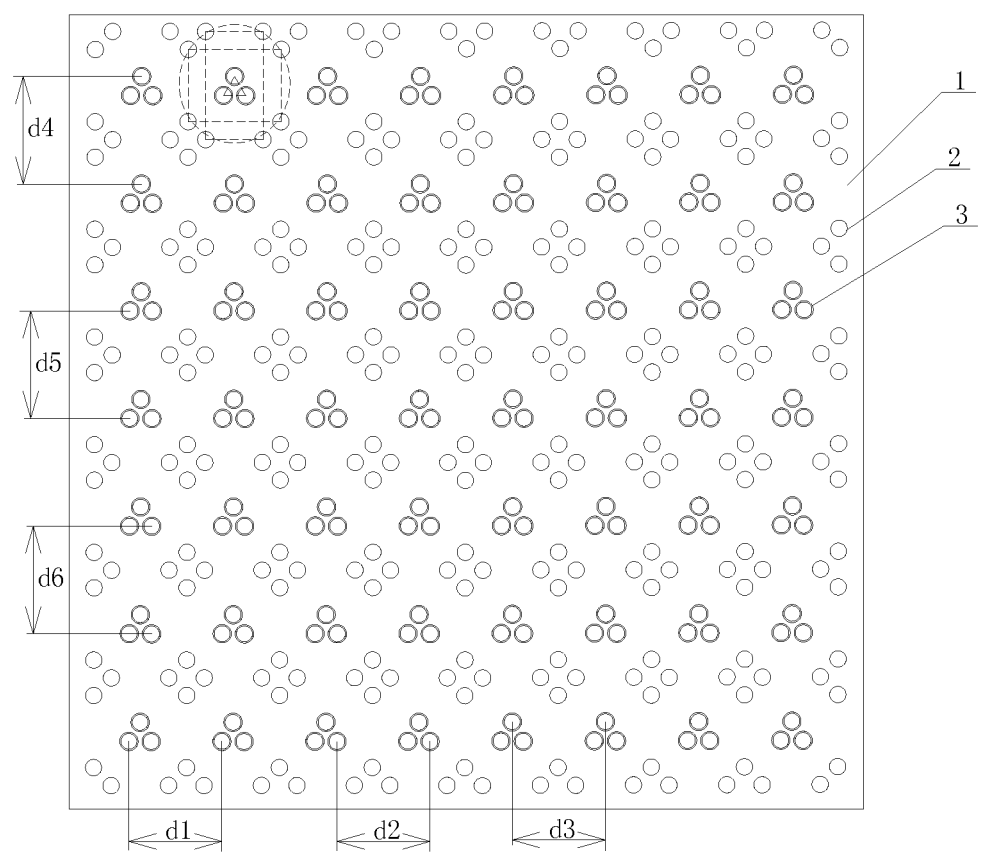
FIG. 1 is the structure diagram of this invention.

For the LED mixed lighting for tissue culture of orchids shown in FIG. 1, according to feature of shape of orchids, the lamp holder 1 is equipped with 254 pieces of red LED 2 with a centre wavelength of 630 nm and 168 pieces of blue LED 3 with a centre wavelength of 460 nm, which can compose 56 units of the same size and shape. Each unit is comprised of 8 red LEDs in elliptical pattern and 3 blue LEDs inside the ellipse. For 56 units of the same size and shape, 8 units are arranged at horizontal direction and 7 units are arranged at vertical direction, and all units have the same shape and structure. In each unit, 3 blue LEDs will gather together and distribute in triangular pattern, and connecting lines of central point of these 3 blue LEDs also compose a regular triangle; said 8 red LEDs are separated at interval, among which 4 red LEDs will be a group, and the remaining 4 red LEDs will be the other group, and each group of 4 red LEDs are distributed in rectangular pattern.

Lamp holders can be in rectangle shape, or in square pattern of other dimension and the like. And the square of the same length of sides is preferred, of which the length and width are preferred to be 30 cm×30 cm (both the length and the width of LED mixed lighting can be enlarged to be 50 cm, and the distance between adjacent units can vary within 1.3-5 cm).

The far peripheral side of the lighting will use red LED, and red LED of each unit will be shared by adjacent units, and 2 red LEDs at the most outer side are 2 red LEDs at the most outer side of the opposite side of adjacent unit. That is to say, 2 red LEDs at far right side of each unit are also the 2 red LEDs at far left side of adjacent units, and 2 red LEDs at far left side of each unit are also the 2 red LEDs at far right side of adjacent units, and 2 red LEDs at lower side of each unit are also the 2 red LEDs at upper side of adjacent units, and 2 red LEDs at upper side of each unit are also the 2 red LEDs at lower side of adjacent units.

Figure 2:
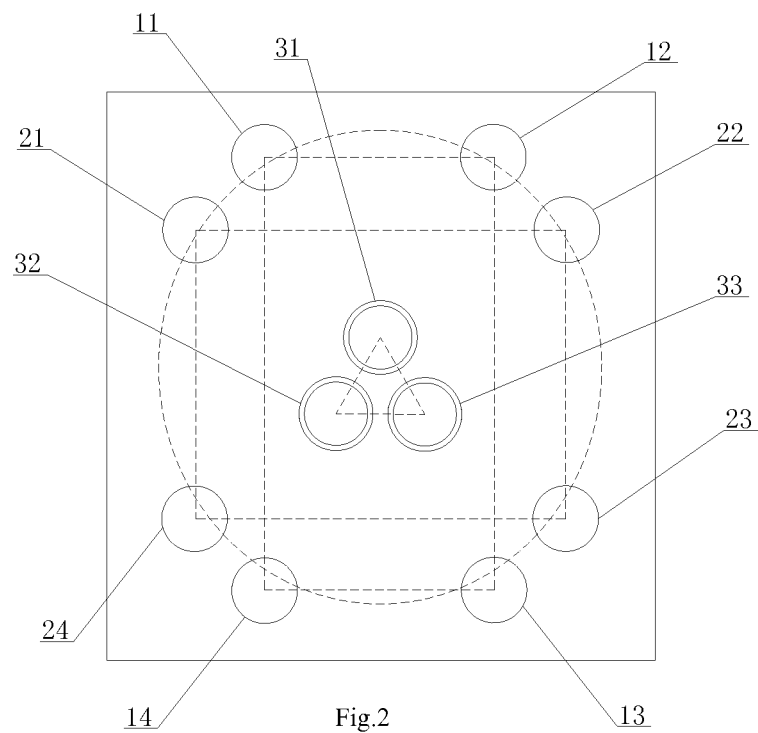
FIG. 2 is an enlarged view of structure of one unit shown in FIG. 1.
Figure 3:
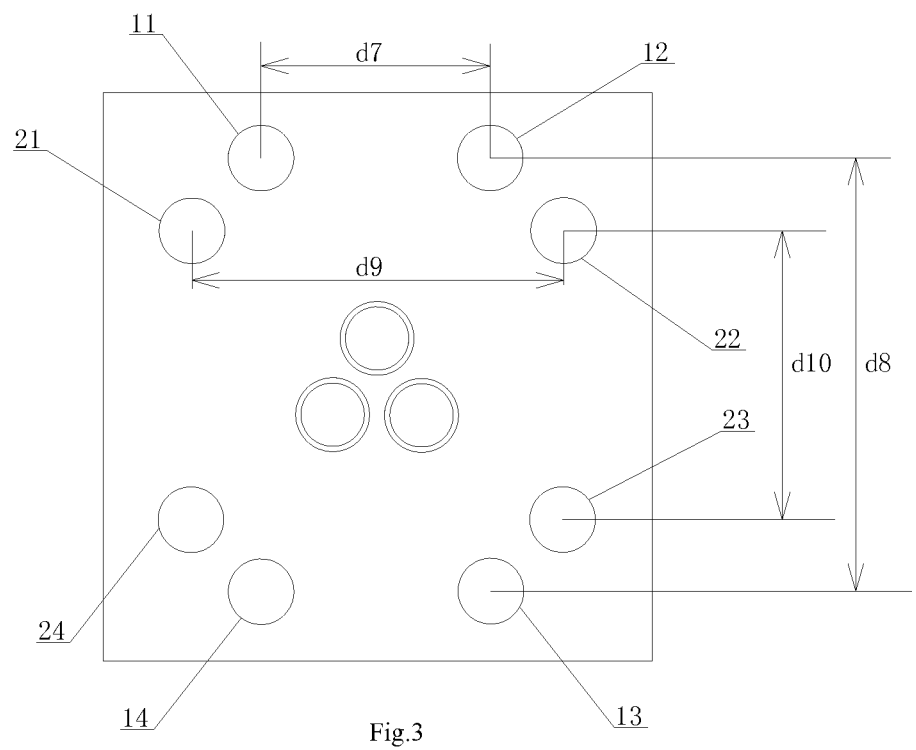
FIG. 3 is a sketch map of the distance between red LEDs and blue LEDs shown in FIG. 2.

As shown in FIG. 1, the distance between central points of blue LEDs corresponding to adjacent units at left and right side is 3.52 cm (namely d1, d2 and d3), and the distance between central points of blue LEDs corresponding to adjacent units at upper and lower side is 4.08 cm (namely d4, d5 and d6). The unit shown in FIG. 2 is comprised of 3 blue LEDs gathered together and 8 red LEDs surrounding these 3 blue LEDs. 3 blue LEDs are blue LED 31, blue LED 32 and blue LED 33. These 3 blue LEDs are arranged in triangle pattern, and it is prefer to have a tight arrangement and gather together so as to supply good light source and make the whole set of LED lighting shining evenly. For better installation, usually there may be a small gap between blue LED 31, blue LED 32 and blue LED 33, but the light center of each blue LED is still at the top of three angle of regular triangle. 8 red LEDs are respectively red LED 11, red LED 12, red LED 13, red LED 14, red LED 21, red LED 22, red LED 23 and red LED 24. Light centers of 8 red LEDs are distributed around the side of an ellipse, which according to clockwise sequence are red LED 11, red LED 12, red LED 22, red LED 23, red LED 13, red LED 14, red LED 24 and red LED 21 respectively. The distance between red LED 11 and 21 is close while that between red LED 12 and 22 is a little bit far; the distance between red LED 13 and 23 is close, and that between red LED 14 and 24 is also close, among which red LED 11, 12, 13 and 14 compose a group in rectangle pattern. And red LED 21, 22, 23 and 24 is another group in rectangle pattern. The central point of these two rectangles is coincident with the central point of 3 blue LEDs. Light center of red LED 11 is A; light center of red LED 21 is B; light center of red LED 12 is C; light center of red LED 22 is D; light center of red LED 13 is E; light center of red LED 23 is F; light center of red LED 14 is G; and light center of red LED 24 is H. As shown in FIG. 3, the distance d7 between A and C is 2.18 cm; the distance d8 between C and F is 4.07 cm; the distance d9 between B and D is 3.52 cm and the distance d10 between D and E is 2.74 cm.

8 red LEDs of each unit will compose 2 groups, respectively controlled by a smart controller with a micro processor as its core, among which, red LED 11, 12, 13 and 14 belong to a group, and red LED 21, 22, 23 and 24 belong to another group, and blue LED 31, blue LED 32 and blue LED 33 will be controlled separately by the controller, and thus, for each unit, the red-blue light ratio of 4:1, 4:2, 4:3, 8:1, 8:2 and 8:3 can be realized. In addition, such realization method can be combined randomly. For example, a group of red LED 11, 12, 13 and 14 can combine with any one of three blue LED to realize a red-blue light ratio of 4:1, or another group of LED 21, 22, 23 and 24 can combine with with any one of three blue LED to realize a red-blue light ratio of 4:1. When red-blue light ratio is 4:2, it may be the result of combination between any group of two LEDs and any one of three blue LEDs. When red-blue light ratio is 4:3, it may be the result of combination between any group of two LEDs and any one of three blue LEDs. When red-blue light ratio is 8:1, it may be the result of combination between two LEDs and any one of three blue LEDs. When red-blue light ratio is 8:2, it may be the result of combination between two LEDs and any two of three blue LEDs. When red-blue light ratio is 8:3, it is the result of combination between two LEDs and three blue LEDs.

Following lightening methods are preferred, according to growth features of orchids, especially for tissue culture of *dendrobium candidum*, ornamental *dendrobium* and *phalaenopsis* and other orchids.

Figure 4:
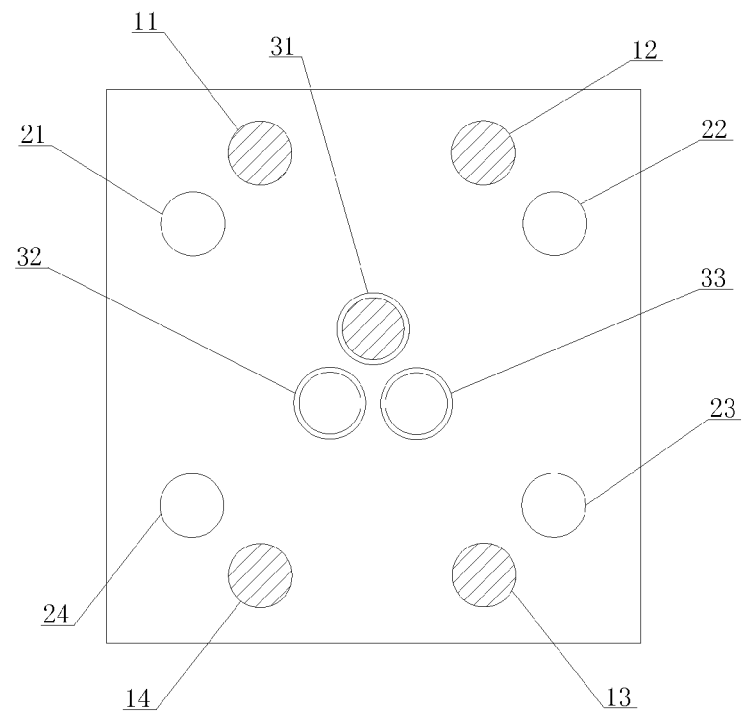
FIG. 4 is effect chart of 4:1 red-blue light ratio shown in FIG. 2.

The FIG. 4 is the effect chart of red-blue ratio of 4:1, among which red LED 11, 12, 13 and 14 and blue LED 31 are lightened. When red LED 11, 12, 13 and 14 and blue LED 31 are lightened, the red-blue proportion of the whole lighting is 128:56.

Figure 5:
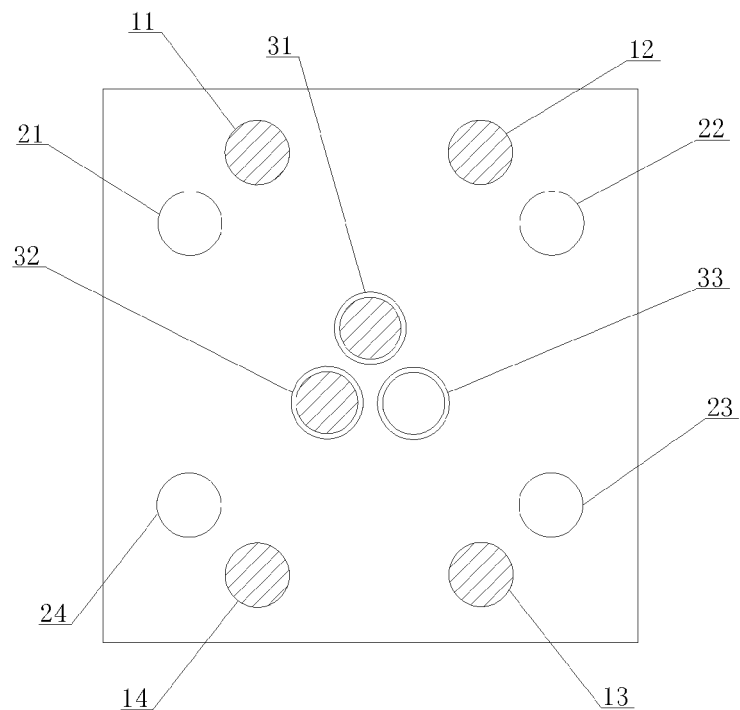
FIG. 5 is effect chart of 4:2 red-blue light ratio shown in FIG. 2.

The FIG. 5 is the effect chart of red-blue ratio of 4:2, among which red LED 11, 12, 13 and 14 and blue LED 31 and 32 are lightened. When red LED 11, 12, 13 and 14 and blue LED 31 and 32 are lightened, the red-blue proportion of the whole lighting is 128:112.

Figure 6:
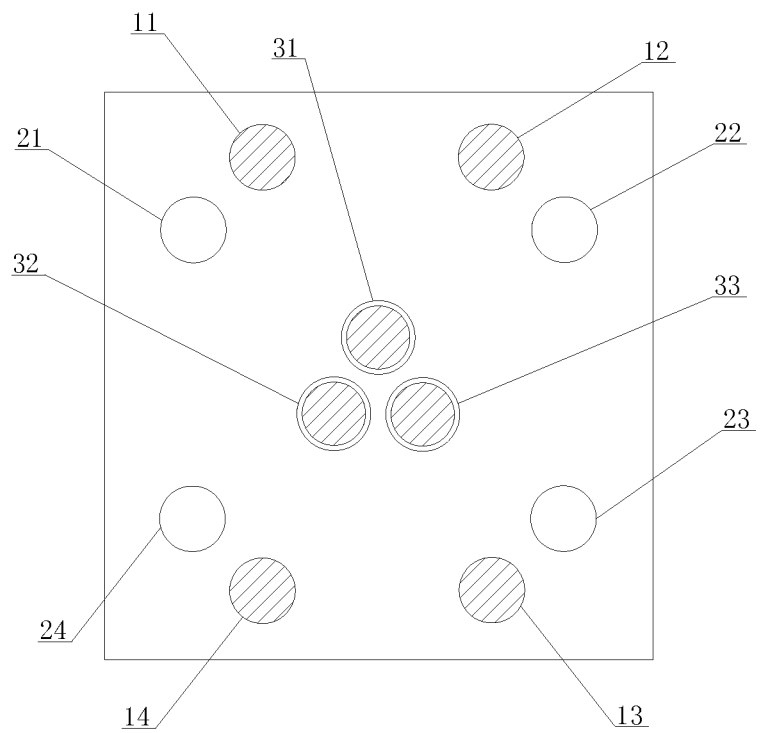
FIG. 6 is effect chart of 4:3 red-blue light ratio shown in FIG. 2.

The FIG. 6 is the effect chart of red-blue ratio of 4:3, among which red LED 11, 12, 13 and 14 and blue LED 31, 32 and 33 are lightened. When red LED 11, 12, 13 and 14 and blue LED 31, 32 and 33 are lightened, the red-blue proportion of the whole lighting is 128:168.

Figure 7:
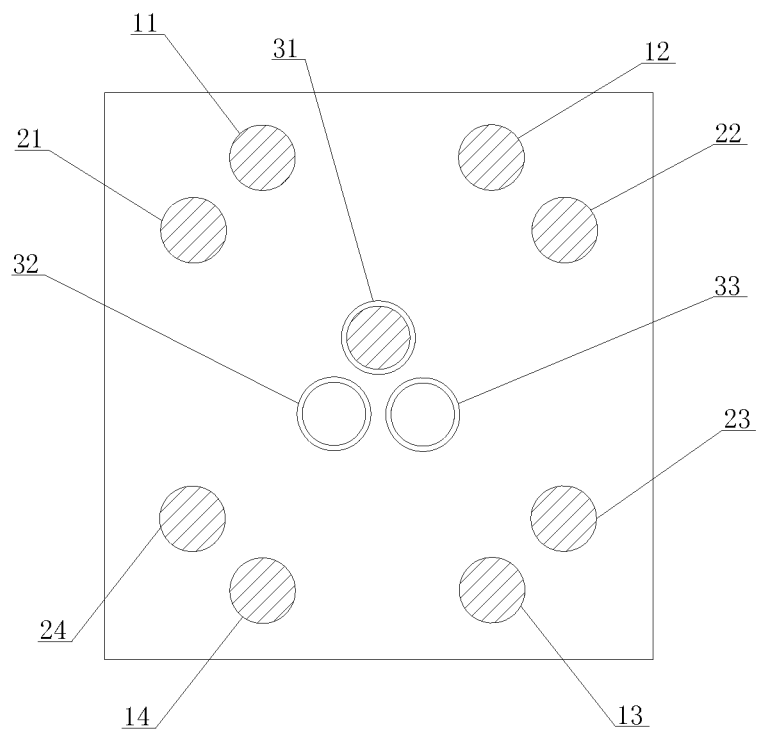
FIG. 7 is effect chart of 8:1 red-blue light ratio shown in FIG. 2.

The FIG. 7 is the effect chart of red-blue ratio of 8:1, among which red LED 11, 12, 13 and 14 and LED 21, 22, 23 and 24 and blue LED 31 are lightened. When red LED 11, 12, 13 and 14 and LED 21, 22, 23 and 24 and blue LED 31 are lightened, the red-blue proportion of the whole lighting is 254:56.

Figure 8:
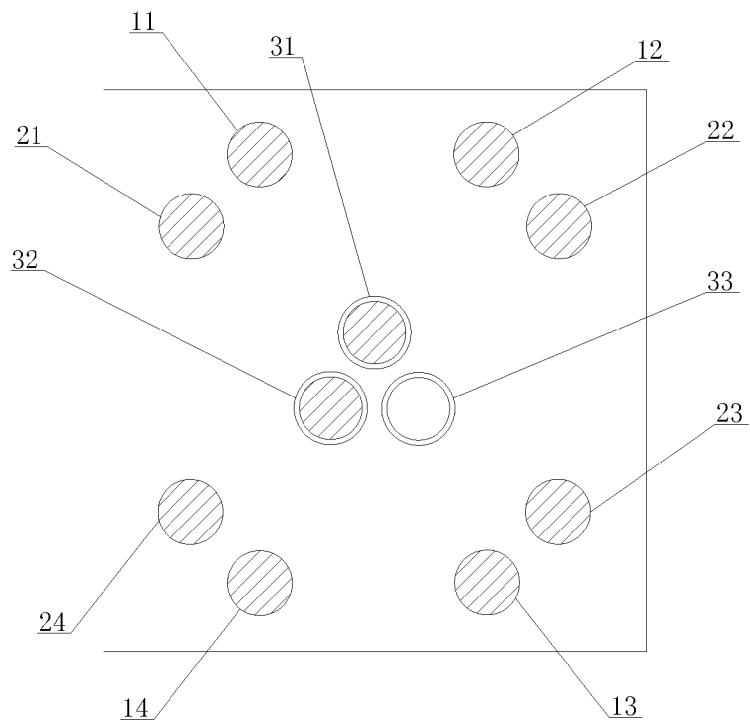
FIG. 8 is effect chart of 8:2 red-blue light ratio shown in FIG. 2.

The FIG. 8 is the effect chart of red-blue ratio of 8:2, among which red LED 11, 12, 13 and 14 and LED 21, 22, 23 and 24 and blue LED 31 and 32 are lightened. When red LED 11, 12, 13 and 14 and LED 21, 22, 23 and 24 and blue LED 31 and 32 are lightened, the red-blue proportion of the whole lighting is 254:112.

Figure 9:
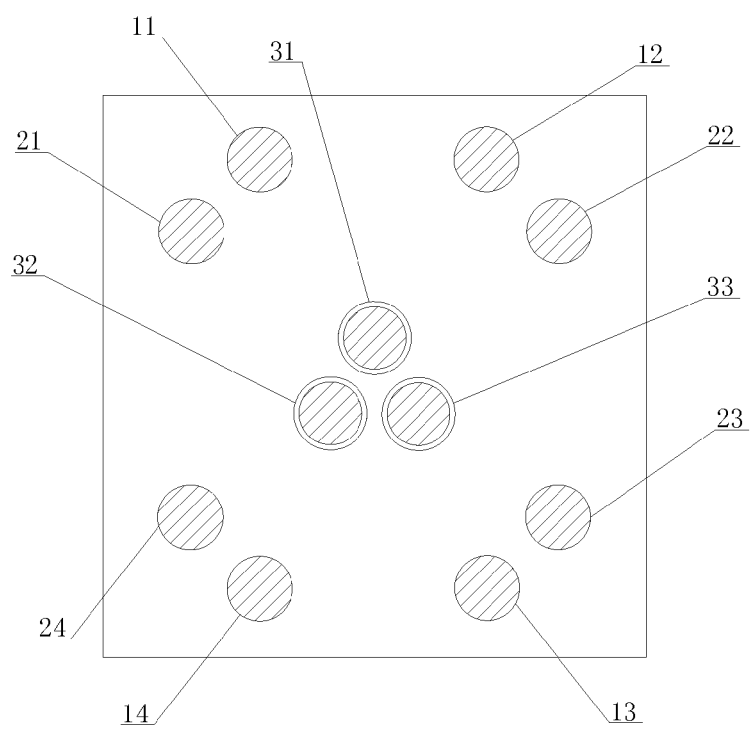
FIG. 9 is effect chart of 8:3 red-blue light ratio shown in FIG. 2.

The FIG. 9 is the effect chart of red-blue ratio of 8:3, among which red LED 11, 12, 13 and 14 and LED 21, 22, 23 and 24 and blue LED 31, 32 and 33 are lightened. When red LED 11, 12, 13 and 14 and LED 21, 22, 23 and 24 and blue LED 31, 32 and 33 are lightened, the red-blue proportion of the whole lighting is 254:168.

What is claimed is:

1. A LED fixed lighting for tissue culture of orchids comprising:
   a lamp holder, a plurality of red LEDs and blue LEDs on the lamp holder;
   the plurality of red and blue LEDs constitute a plurality units;
   each unit has three blue LEDs and eight red LEDs which is surrounding the three blue LEDs in an elliptical or rounded pattern,
   said 3 blue LEDs are gathered in a triangular pattern, and said 8 red LEDs are separated at interval, among which four red LEDs compose a first red LEDs group, and the other four LEDs compose a second red LEDs group, and each four red LEDs of the first and second red LEDs groups are distributed in a first and second rectangular patterns respectively;
   the triangular pattern, first and second rectangular patterns of one unit have a coincidence point, a space between two coincidence points of two near units is within 1.3 to 5 cm.

2. The LED mixed lighting for tissue culture of orchids according to claim 1, wherein the far peripheral LEDs at lamp holder are red LEDs, and two red LEDs at most outer side of the one unit also become two red LEDs at most outer side of adjacent the one unit.

3. The LED mixed lighting for tissue culture of orchids according to patent claim 2, wherein for the triangular pattern, first and second rectangular patterns of one unit have a coincidence point, a space between two coincidence points of two near units is within 1.3 to 5 cm.

4. The LED mixed lighting for tissue culture of orchids according to claim 3, wherein for each unit, the light quality is controlled with a red-blue light ratio of 4:1, 4:2, 4:3, 8:1, 8:2 or 8:3 by turning on or turning off a part of the red LEDs and/or blue LEDs.

5. The LED mixed lighting for tissue culture of orchids according to claim 4, wherein 2 groups divided from 8 red LEDs of each unit are controlled by one controller, and 3 blue LEDs are controlled by three controllers.

6. The LED mixed lighting for tissue culture of orchids according to claim 5, wherein a center wavelength of red LED is 630 nm, and that of blue LED is 460 nm.

7. The LED mixed lighting for tissue culture of orchids according to claim 1, wherein for each unit, light quality is controlled with a red-blue light ratio of 4:1, 4:2, 4:3, 8:1, 8:2 or 8:3 by turning on or turning off a part of the red LEDs and/or blue LEDs.

8. The LED mixed lighting for tissue culture of orchids according to claim 7, wherein 2 groups divided from 8 red LEDs of each unit are controlled by one controller, and 3 blue LEDs are controlled by three controllers.

9. The LED mixed lighting for tissue culture of orchids according to claim 8, wherein a center wavelength of the red LED is 630 nm, and that of the blue LED is 460 nm.

* * * * *